United States Patent
Paas (10) Patent No.: US 7,174,361 B1
(45) Date of Patent: Feb. 6, 2007

(54) SCRIPTING TASK-LEVEL USER-INTERFACES

(75) Inventor: J. Julian Paas, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/541,994

(22) Filed: Apr. 3, 2000

(30) Foreign Application Priority Data

Feb. 4, 2000 (CA) .................................... 2298003

(51) Int. Cl.
*G06F 15/16* (2006.01)

(52) U.S. Cl. ...................... 709/203; 715/778; 715/740; 715/749; 715/760

(58) Field of Classification Search ................. 709/203; 715/749, 760, 778, 740
See application file for complete search history.

(56) References Cited

U.S. PATENT DOCUMENTS

| | | | | | |
|---|---|---|---|---|---|
| 5,734,831 | A | * | 3/1998 | Sanders | 709/223 |
| 6,167,567 | A | * | 12/2000 | Chiles et al. | 717/173 |
| 6,249,291 | B1 | * | 6/2001 | Popp et al. | 345/473 |
| 6,327,608 | B1 | * | 12/2001 | Dillingham | 709/203 |
| 6,368,273 | B1 | * | 4/2002 | Brown | 600/300 |
| 6,374,246 | B1 | * | 4/2002 | Matsuo | 707/10 |
| 6,480,882 | B1 | * | 11/2002 | McAdam et al. | 709/202 |
| 6,516,353 | B1 | * | 2/2003 | Richards | 709/310 |
| 2003/0145049 | A1 | * | 7/2003 | Hirabayashi | 709/203 |
| 2005/0149879 | A1 | * | 7/2005 | Jobs et al. | 715/796 |

\* cited by examiner

*Primary Examiner*—Ario Etienne
*Assistant Examiner*—Barbara Burgess
(74) *Attorney, Agent, or Firm*—Martin J. McKinley; Dillon & Yudell LLP

(57) ABSTRACT

Methods and apparatuses are disclosed for use in network-centric computing for scripting user-interface components together on an as-needed basis for purposes of executing a software application preferably stored on a server. The application may be called from a container/desktop of a client which in turn launches a script. The script may be stored on a server, on the desktop, or on a removable media, such as an optical or magnetic diskette. The script determines each task to be performed in the application and calls each node associated with the tasks. The script further verifies the policies of the container/desktop with respect to invoking, initializing, and executing the node. Once a task has been performed on the client, the script determines the next node, if any, and may discard the previous node in accordance with the policy framework of the container/desktop. In this way, applications can be performed in a myriad of computing devices, some having little or no memory, by downloading to the client only those user-interface components needed for a particular task to be performed.

24 Claims, 9 Drawing Sheets

SCRIPTING TASK-LEVEL USER-INTERFACES

BACKGROUND OF THE INVENTION

1. Field of the Invention

This invention relates generally to the field of network-centric software development and more particularly relates to scripting user-interface components of a software application on an as-needed task basis.

2. Description of the Related Art

Like everything else, computer use has changed over the years. In the early days, large mainframe computers dominated the industry until the advent of the personal stand-alone computer and now many businesses and homes have at least one personal stand-alone computer, a PC. A new paradigm of computing, however, has emerged: network-centric computing or distributed computing in which at least two, but more likely many more computers, called clients and servers, are interconnected through a network wherein the logic and the software applications used by one client or server resides on another server. Thus, a server may provide the application or client program software, i.e., a software program typically written using a system programming language and used by an end user, and perhaps the databases for a number of other servers and clients over a network. For instance, a person entering data to schedule employees' work days may be using a scheduling client program or application. A person writing a paper may be using a word processing application. A person performing on-line banking is using a banking application.

In many instances and increasingly more so, the network connecting clients and servers is the world wide web. Software applications are written in a system programming language independent of the operating system of either the server or the client, such as JAVA™, to facilitate their use over the world wide web. Java is a trademark of Sun Microsystems. Java applications written on one computer are transferred over a network, such as the Internet, to any processing device having a Java virtual machine regardless of the hardware or software in the receiving machine.

Thus, this has created another fundamental change in the methodology of software developers in writing code for these applications. Rather than writing one massive self-contained application having thousands or millions of lines of code, software developers select and weave together smaller portions of code, called components, each associated with a particular function that can be reused across multiple applications. Components are standard software that can be pulled off a server and incorporated into new applications using a tool by software developers. For example, a calendar component may be used in several applications such as a scheduling application, a presentation application, a data base application to calculate employee's vacation and pay, etc.

Software developers started to use a scripting language to "glue" these components together into an application. Scripting languages and system programming languages are complementary and most major computing platforms provide both kinds of languages in which the reusable components are created with a system programming language and then glued together with a scripting language. Scripting languages, such as PERL, PYTHON, REXX, TCL, VISUAL BASIC and the UNIX shells, assume a collection or library of useful components written in other languages already exists. Visual Basic is a trademark of Microsoft Corporation; UNIX is a registered trademark licensed by The Open Group. Scripting is intended primarily for plugging together components, e.g., arranging user-interface controls on the screen or assembling filter programs into pipelines.

One highly desirable characteristic of a network-centric application is a zero-install client in which the software that executes the application on the client is not resident on the client computing device. Instead, the application is downloaded to the client from a server upon invocation or on-demand. There is tremendous cost benefit by not managing the application on many client devices and to download the application to a client when needed.

Downloading applications, however, require knowledge of the client device that hosts the user-interface portion of an application. Downloading large blocks of code from the server to the client so the user-interface portion would be a colorful display having moving pictures and sounds and other "bells and whistles" is prohibitive. Such software distribution would have to be planned to occur "off schedule" so as not to interfere with normal operation of the client and/or the server. Where once it was assumed that the client device was a PC and with its large memory capacity, now a myriad of simpler appliance-like client devices with less memory exist. A network computer or a thin client has a small fixed amount of memory, and voice response units (VRUs), terminals or web browsers, and even pervasive mobile devices, such as personal digital assistants, pagers, and cell-phones, have even less memory. Therefore, software developers developing applications such as on-line banking or on-line brokering must take into consideration the user-interface capacity of the client device. If the user-interface and the application software are downloaded into the client device, moreover, the latency of downloading has a serious effect on the effective performance of the application.

The problem of creating a high-performance environment for network centric applications in which the applications persist on the server, not on the client, is significant when business processes are encoded using system programming languages as hard-coded links between tasks, moreover, it is difficult for the application to adapt to changes in the business processes and there will also be large amounts of redundant code if the task-based components are to be used within multiple business processes. This is expensive to develop and maintain in large applications or large organizations. Most people are familiar with the model of executing JAVA applets within a web browser. The applets persist on the server and are downloaded and run on the client only when needed. However, the performance of applets with significant function is typically poor because of the large amount of executable code that must be downloaded and a web browser that executes JAVA applets will continue to accumulate byte code files as the applet executes. For that reason, JAVA applets have fallen out of favor.

There is thus a need for a solution that describes the task interfaces of the components and executes the task transitions on behalf of the component. From the point-of-view of the user-interface this mechanism should manage the navigation from one user-interface screen to the next.

SUMMARY OF THE INVENTION

This invention represents a significant improvement in the way that applications can be distributed from a server and executed on a client workstation. The invention overcomes the significant problem of code accumulation on the client workstation. The smallest piece of the application needed by the user at that moment in time, i.e., on an as-needed basis, is downloaded to the client. Typically the user is trying to perform a task and so manipulates the application through a user-interface. As a result, one of the best ways to partition the user-interface for on-demand downloading is on a task basis in which the task-based segments are combined and composed into the larger business processes and procedures of automated applications. The invention, moreover, enables navigation from one part of the user-interface to another as the user performs one task and then another task. When each user-interface component contains the logic that handles the transitions from one to the next, all of the components quickly become tightly coupled through a script of the application code dedicated to maintaining the links between them. From the task's point-of-view, this application code embodies the business processes of the organization, handles the preconditions that must be satisfied before executing the task, and depending on the outcome of the task, determines the next task to be performed.

Thus, one aspect of the invention may be considered a method of executing a software application, comprising the steps of: calling the software application residing on a server from a client in which the client and the server are connected to each other through a network; launching a container/desktop of the client and then having the container/desktop initialize and execute a script of the application; having the script start a user-interface component of the application on the container/desktop and then execute and close the user-interface component; the script further linking to and starting another user-interface component of the application; and then the script executing and closing the previous user-interface component. The method may further comprise the script starting and executing the user-interface components within a policy framework of the container/desktop. The container/desktop may further remove the user-interface components from memory within the client when the user-interface component is closed.

Another aspect of the invention may be considered a method of executing an application having at least two tasks to be interactively executed with a user, with the method comprising: downloading only those user-interface components stored on a server needed to perform a task on a container/desktop of a client; and closing the downloaded user-interface components when no longer needed; and purging the closed user-interface components from the container/desktop when the closed user-interface components are no longer needed.

Another embodiment of the invention is a computer server, comprising a processor, a memory, a bus, and at least one I/O port by which to communicate with a remote client having a container/desktop, an operating system with which to coordinate the processor, the memory, the bus and the at least one I/O port to communicate to the client; an application stored in memory of the server; a script of the application stored in the memory of the server; and a plurality of user-interface components stored in the memory, the script comprising code to connect the user-interface components to comprise the application, wherein the application launches the container/desktop on the client which in turn interacts with the script on the server to download each of the user-interface components from the server to the container/desktop on an as-needed basis.

The invention is also a client device, comprising a container/desktop; an I/O port with which to communicate to one or more servers having software applications, scripts, and user-interface components; and an interactive medium with which to interact with a user, wherein when the user uses the interactive medium to request an application from the server, the container/desktop communicates with the server through the I/O port and invokes a script of the application in the server which downloads user-interface components to the container/desktop according to the script and only on an as-needed basis, and wherein the container/desktop discards the user-interface components no longer needed by the application. The container/desktop may comprises code for implementation of the user-interface component on a personal computer. The container/desktop may further comprise code for implementation of the user-interface component on a voice-response unit, or the container/desktop may comprise code for implementation of the user-interface component on a network computer. The user-interface component may further be implemented on a pervasive mobile device with the container/desktop having the appropriate code. The client device may also be a second server wherein its container/desktop may comprise for implementation of the user-interface component.

The invention may further be summarized as a method to script user-interface components to create an application which is stored on a server and whose user-interface components are downloaded to a container/desktop of a client, with the method comprising: decomposing the presentation logic of the application into a plurality of tasks to be performed interactively with a user on the client; and for each of the tasks, creating a state diagram having a plurality of nodes in which a user-interface component is associated with at least two of the plurality of nodes; writing a script connecting each of the user-interface components in accordance with the state diagram and a policy framework of the container/desktop, wherein the script and the user-interface components are stored on at least one server to which the client is connected and the user-interface components are downloaded to the container/desktop on an as-needed basis.

The invention is also a program product that causes an application to be executed on a server by a user of a client device in which the user interacts through a container/desktop of the client device with the application, the program product comprising a script of a plurality of user-interface components, such that the container/desktop initializes the script and controls the downloading and termination of the user-interface components on an as-needed basis according to the script. The user-interface components may be stored on one or more servers. Some or all of the user-interface components may be stored on the program product.

The invention is also a computing apparatus, comprising means for storing a software application to be performed by a user on a container/desktop; means for invoking a script of a plurality of user-interface components to execute the software application according to a policy framework of the container/desktop; means for executing the script to perform the software application; means for downloading each of the plurality of user-interface components to the container/desktop on an as-needed basis according to the script; and means to display each of the user-interface components and to discard any previous of the user-interface components from the container/desktop when no longer needed by the user to perform the software application in accordance with the policy framework of the container/desktop.

BRIEF DESCRIPTION OF THE DRAWINGS

The novel features believed characteristic of the invention are set forth in the claims. The invention itself, however, as well as a preferred mode of use, objects and advantages thereof, will best be understood by reference to the following detailed description of an illustrative embodiment when read in conjunction with the accompanying drawings wherein:

DESCRIPTION OF THE PREFERRED EMBODIMENT

Figure 1:
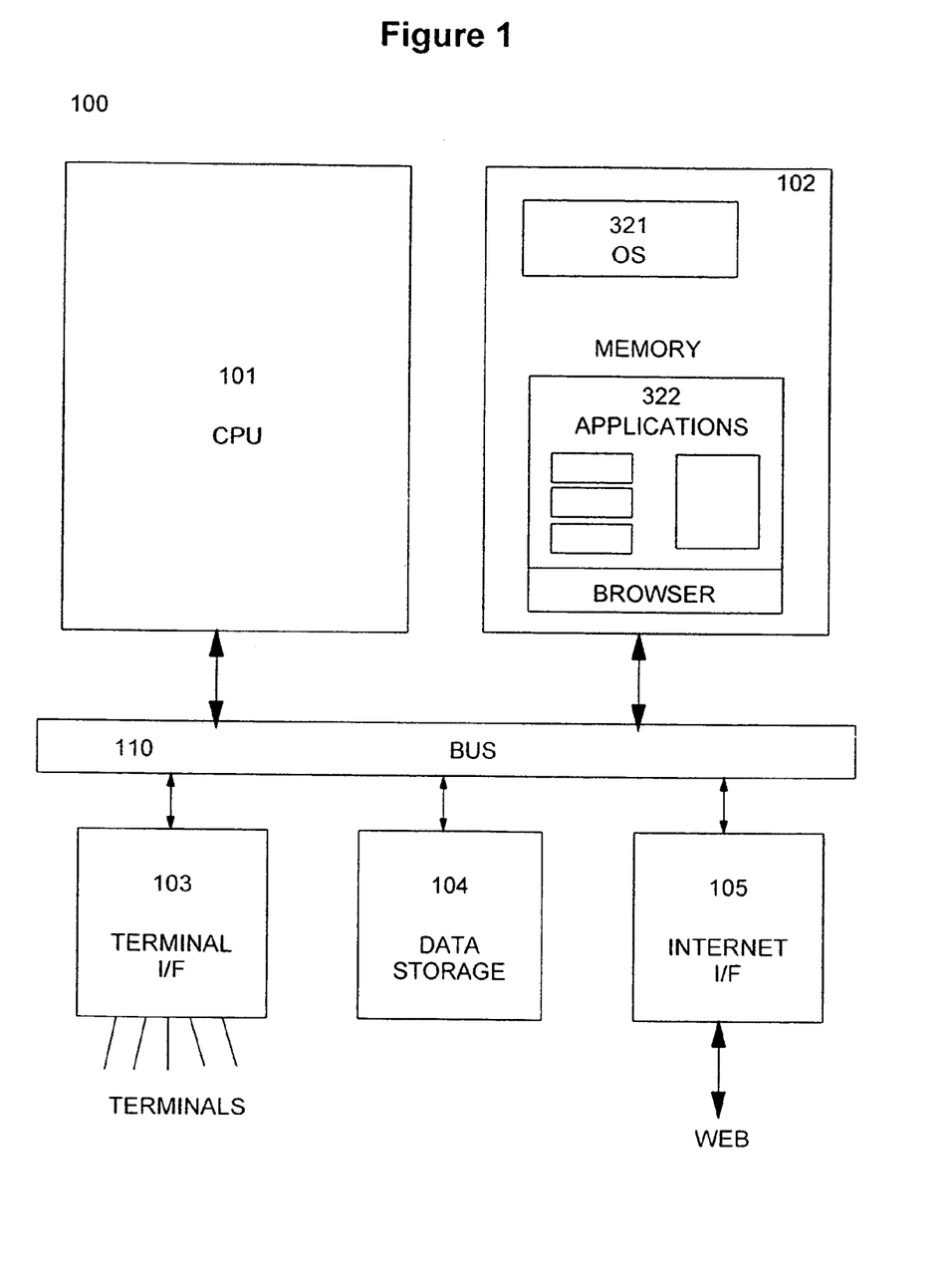
FIG. 1 is a high-level block diagram of a server computer system capable of implementing the preferred embodiment of the invention.

Referring to the drawings, wherein like numbers denote like parts throughout the several views, FIG. 1 shows a high-level block diagram of a server computer system 100, consistent with the preferred embodiment. Computer system 100 comprises central processing unit (CPU) 101, main memory 102, terminal interface 103, data storage 104, and Internet interface 105. The various devices communicate with each other via internal communications bus 110. CPU 101 is a general-purpose programmable processor, executing instructions stored in memory 102; while a single CPU is shown in FIG. 1, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Operating system 321 and applications 322 reside in memory 102. Operating system 321 provides, inter alia, functions, such as device interfaces, management of memory pages, management of multiple tasks, etc. as is well-known in the art. Applications 322 may include a browser which provides a user-interface to the world wide web. Some applications 322, including the browser may be integrated into operating system 321. Terminal interface 103 may support the attachment of a single or multiple terminals, and may be implemented as one or multiple electronic circuit cards or other units. Data storage 104 preferably comprises one or more rotating magnetic hard disk drive units, although other types of data storage could be used. Internet interface 105 provides a physical connection for transmission of data to and from the Internet, and could use any various available technologies. Communications bus 110 supports transfer of data, commands and other information between different devices; while shown in simplified form as a single bus, it is typically structured as multiple buses; and may be arranged in a hierarchical form. The computer system shown in FIG. 1 is intended to be a simplified representation, it being understood that many variations in system configuration are possible in addition to those specifically mentioned here. While system 100 could conceivably be a personal computer system, the server may also be a larger computer system such as an IBM Enterprise System or an IBM AS/400 system. AS/400 is a trademark of the IBM Corporation.

Server computer 100 and its components are shown and described in FIG. 1 as a more or less single, self-contained computer system and it is possible to implement a world wide web server in such a manner. It is alternatively possible to use multiple computer systems, particularly multiple systems which share a single large database, each having a specialized task. For example, one or more computer systems could be dedicated to database maintenance, while one or more other computer systems are dedicated to servicing requests received from clients. References herein to a server or search engine should be understood to include either a single computer or a collection of computer systems which respond to search requests.

Figure 2:
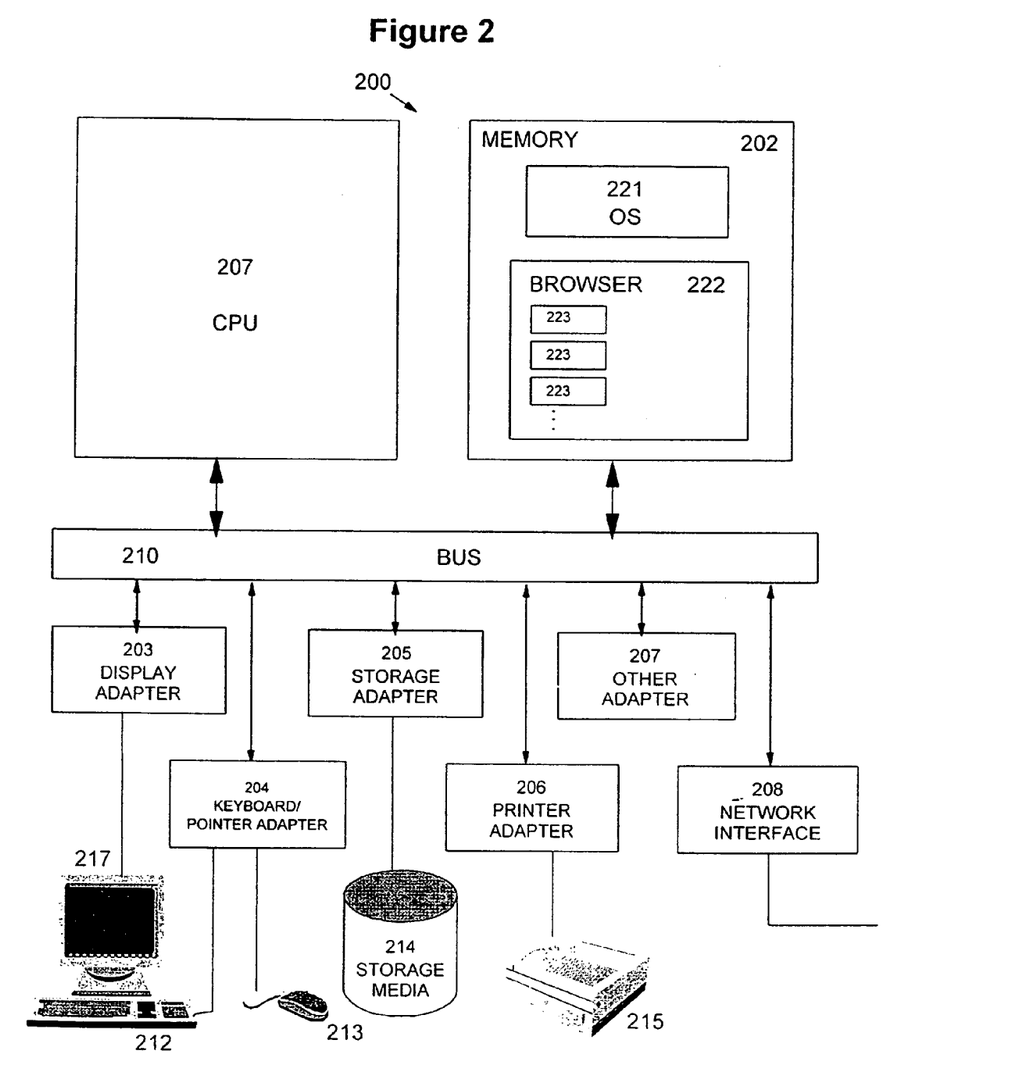
FIG. 2 is simplified block diagram of a client system which may download user-interfaces from an application stored on the server in accordance with principles of the invention.

FIG. 2 is an example of a client system 200 which may download user-interfaces from an application stored on the server computer 100. Client system 200 may be a computer system including a CPU 201, main memory 202, various device adapters and interfaces 203–208, and communications bus 210. CPU 201 is a general-purpose programmable processor, executing instructions stored in memory 202; while a single CPU is shown in FIG. 2, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Communication bus 210 supports transfer of data, commands and other information between different devices; while shown in simplified form as a single bus, it may be structured as multiple buses, and may be arranged in a hierarchical form. Display adapter supports video display 211, which may be a cathode-ray tube display or a touch panel, although other display technologies may be used. Keyboard/pointer adapter 204 supports keyboard 212 and pointing device 213, depicted as a mouse, it being understood that other forms of input devices could be used. Storage adapter 205 supports one or more data storage devices 214, which may be rotating magnetic hard disk drives or CD-ROM drives, although other data storage devices could be used. Printer adapter 206 supports printer 215. Adapter 207 may support any of a variety of additional devices, such as audio devices, etc. Network interface 208 provides a physical interface to the Internet. This interface may comprise a modem connected to a telephone line, through which an Internet access provider or on-line service provider is reached, but increasingly other higher bandwidth interfaces are implemented. For example, client system 200 may be connected to a local mainframe computer system via a local area network using an Ethernet, Token Ring, or other protocol, the mainframe in turn being connected to the Internet. Alternatively, Internet access may be provided through cable TV, wireless, or other types of connection. The representation of FIG. 2 is intended as an exemplary simplified representation of a high-end client, it being understood that in other client systems 200 many variations in system configuration are possible in addition to those mentioned here.

Client system 200 need not be a personal computer system, and it may be a larger computer system, such as another server, or a smaller computer system, such as notebook or laptop computer. Finally, client system 200 need not be a computer at all, but may be a simpler appliance-like client devices with less memory. It is fully intended that client system 200 include any electronic device which may interact with a server 100 through user-interfaces to accomplish an application residing on the server system 100. Examples of other intended client systems 200, which is not intended to be exhaustive but merely exemplary, include a network terminal or a thin client or other terminal-like devices having smaller memory; voice response units (VRUs); terminals; world wide web browsers; and even pervasive mobile devices, such as personal digital assistants, pagers, and cell-phones. Such special-purpose devices for accessing the world wide web, such as an Internet access box for a television set, or a portable wireless web accessing device, which can implement a user-interface for the purpose of invoking and executing an application is intended to be within the scope of a client system 200.

As will be described in detail below, aspects of the preferred embodiment pertain to specific method steps implementable on a server 100 and/or a client 200 system. In an alternative embodiment, the invention may be implemented as a computer program-product for use with either or both a server 100 and a client 200. The programs defining the functions of the preferred embodiment can be delivered to the server 100 and/or to the client 200 via a variety of signal-bearing media, which include, but are not limited to: (a) information permanently stored on non-writable storage media, e.g., read only memory devices within either computer such as CD-ROM disks readable by CD-ROM drive 214; (b) alterable information stored on writeable storage media, e.g., floppy disks within diskette drive or hard-disk drive, such as shown as 214 in FIG. 2; or (c) information conveyed to a computer by a telephone or a cable media network, including wireless communications. Such signal-bearing media, when carrying computer-readable instructions that direct the functions of the present invention, represent alternative embodiments of the present invention.

Figure 3:
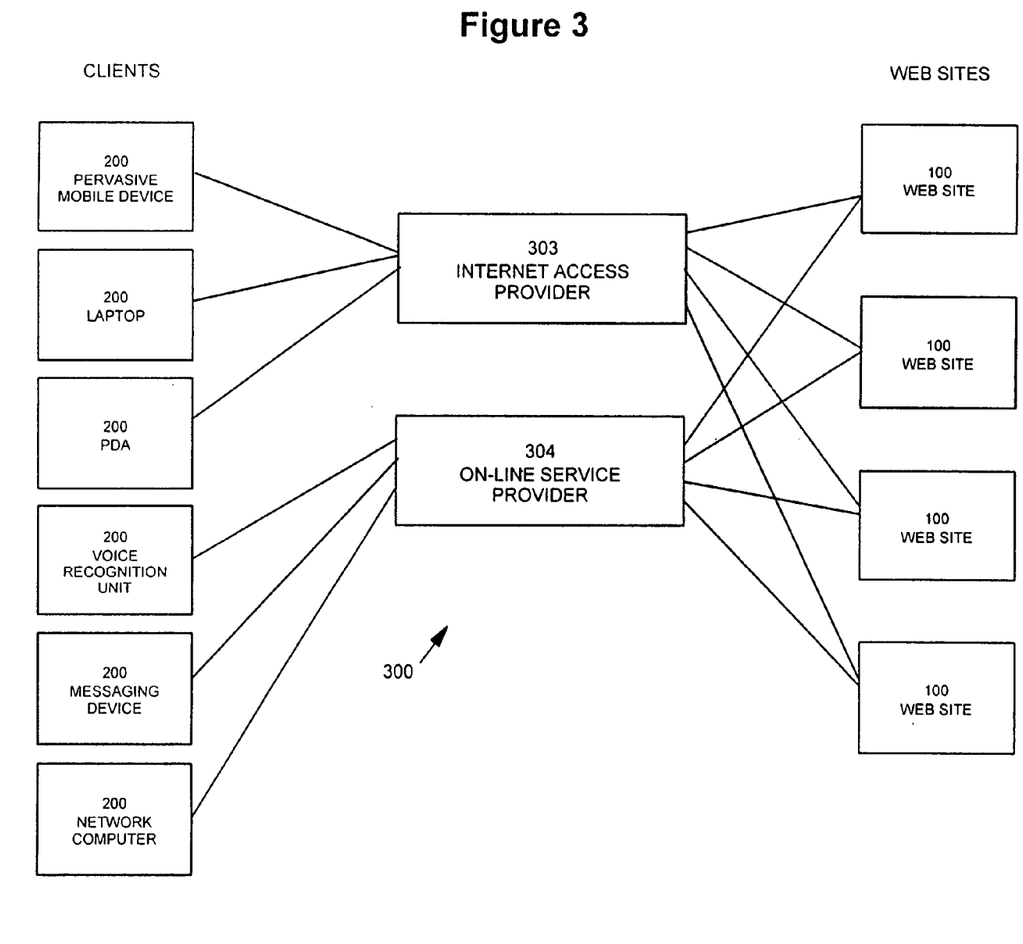
FIG. 3 is a simplified representation of a computer network 300 capable of implementing the preferred embodiment of the invention.

FIG. 3 is a simplified representation of a computer network 300. Computer network 300 is representative of the Internet, which can be described as a known computer network based on the client-server model discussed herein. Conceptually, the Internet includes a large network of servers 100 that are accessible by client systems 200 through a private Internet access provider 303 or an on-line service provider 304. Each of the client systems 200 may run a respective browser to access servers 100 via the access providers or, in the preferred embodiment, may rely on a browser in the server 100. Each server 100 may have user-interface components that can be downloaded through the world wide web or other connections to the clients 200 and scripted together to form an application. Moreover, an application need not be stored on only one server 100; rather various tasks of a single application may be stored on more than one server 100 to which a client system 200 is connected through the Internet. A network path to servers 100 is identified by a Universal Resource Locator (URL) having a known syntax for defining a network connection. While various relatively direct paths are shown, it will be understood that FIG. 3 is a conceptual representation only, and that a computer network such as the Internet may in fact have a far more complex structure.

Figure 4:
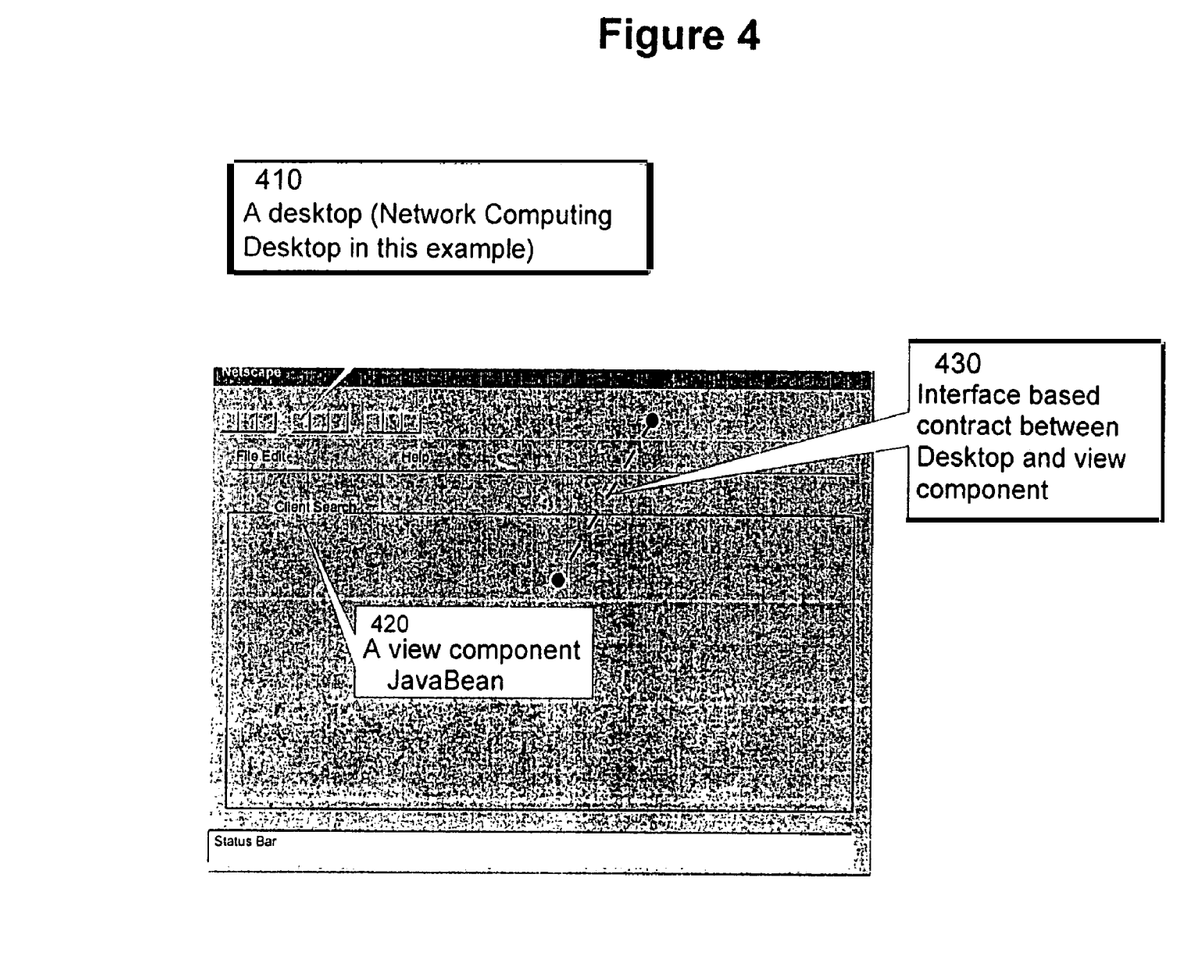
FIG. 4 illustrates a simple user-interface component executing within the context of a script launched by a desktop in accordance with principles of the invention.

Each client system 200 has the necessary combination of hardware and software, called a container, to display or otherwise communicate user-interface components between the application and the user. Most users are familiar with the desktop as being one type of container and hereinafter the terms shall be used interchangeably although the invention is intended to be used in the broader context of a container. The container/desktop provides the execution context for the application's user-interface components that execute on the client. FIG. 4 shows a typical user-interface component 420 executing within the context of a script launched by the desktop 410 according to principles of the invention. The desktop 410 executes in a web browser or webtop as an applet. As mentioned, different examples of containers/desktops can be used in the context of the invention. One example of a container/desktop might be an applet that does very little other than load one specific user-interface component which is useful if a user-interface component is used standalone in an Internet application or other workplace. At the other end of the spectrum, an application's container/desktop might emulate a full-featured windowing operating system like Windows or OS/2 in order to provide freedom and flexibility by allowing the user to employ ad hoc processes by starting new applications as needed and running several applications concurrently.

The convergence of computing, telecommunications and consumer electronics is causing a tremendous growth in the number and variety of mobile computer client devices 200. This mobile architecture enables the multitude of emerging devices including laptops, sub-notebooks, handheld computers, such as personal digital assistants and companion devices, and mobile appliances, such as smartphones, pagers, simple messaging devices and wearable devices, to connect to a server's applications.

Thus when the client system 200 is a mobile device, the container/desktop supports a variety of multi-modal interfaces including traditional keyboard and mouse interfaces, small text screens, pen, touch screens, speech recognition, text-to-speech and other emerging technologies such as wearable devices. The container/desktop then enables the use of the server's applications on each of these client systems 200.

The user-interface components and the container/desktop interact with one another through established programming model interfaces as is known in the art. The container/desktop has several responsibilities, one of which is to authenticate the user and to hold onto the handle for that authentication session and any associated server sessions. Another responsibility of the container/desktop is to provide the unchanging or static functionality common to application's user interface components, e.g., toolbars, menu bars, and information bars. This static functionality in the container/desktop remains loaded and active in the web browser and as a result the startup overhead of each user-interface component can be greatly reduced. Finally, the container/desktop acts as a harness or shell for running scripts and loading the user-interface components determined by the script. This decouples the application's user-interface components from their execution environment and allows the execution context to be changed without affecting application code. Consequently, it becomes possible to provide different kinds of container/desktops depending on the circumstances.

Because the container/desktop manages the transitions between task-based user-interface components it is possible to create different types of containers that implement different task management policies. An example of a policy is to terminate each task when the transition to the next task occurs or when the parent task terminates. Each container/desktop has its own policy framework which constrains the user-component interface and typically this policy framework will be known to the software developer scripting the user-interface components of an application. Other preferably known policies within the framework include the number of tasks, e.g., whether a single task, a fixed number, or a user controlled variable number of tasks, can be executed simultaneously. Some computing devices have more computing power and are more suitable for multitasking user-interfaces whereas, others devices, for instance, a cellular phone may not be able to run more than one user-interface component. Another policy is the number of user-interface components that can be viewed concurrently, as well as the display policy of the container/desktop regarding the position, resizing, or cropping of user-interface components, and whether a single display panel, multiple tiled panels, or overlapping windows would be implemented, etc. In order to solve the problem of limited computing resources, when navigation occurs from one task-based user-interface component to the next, the component representing the completed task can be terminated and removed from memory or disk storage and so the policies of garbage collection may concern whether a terminated task and/or user-interface component are retained and for how long. Security policies, such as data credentials, in launching a task, in navigating from one task to another task, or in moving from step to step within a task should be known. Auditing or data mining policies which can record the user that navigated to a step or task, the result, etc. are other examples of container policies. Thus, the invention contemplates that user-interface components can be implemented in different user-interface environments because the policies are encapsulated in the container/desktop. Thus, a user-interface component can be reused across a wide variety of computing devices.

In accordance with the preferred embodiment of the present invention, user-interfaces are partitioned into small independent components that are quickly downloaded on an as-needed basis which may be used in emerging "on-demand, zero install, network centric application environments." Reusable user-interface components are easily scripted together in terms of business processes and although the business processes change, the components themselves do not necessarily need to be modified. When the tasks within the business processes change, moreover, the components need only to be changed in a single location. All these inventive features provide greater flexibility and reduced development and maintenance costs.

Figure 5:
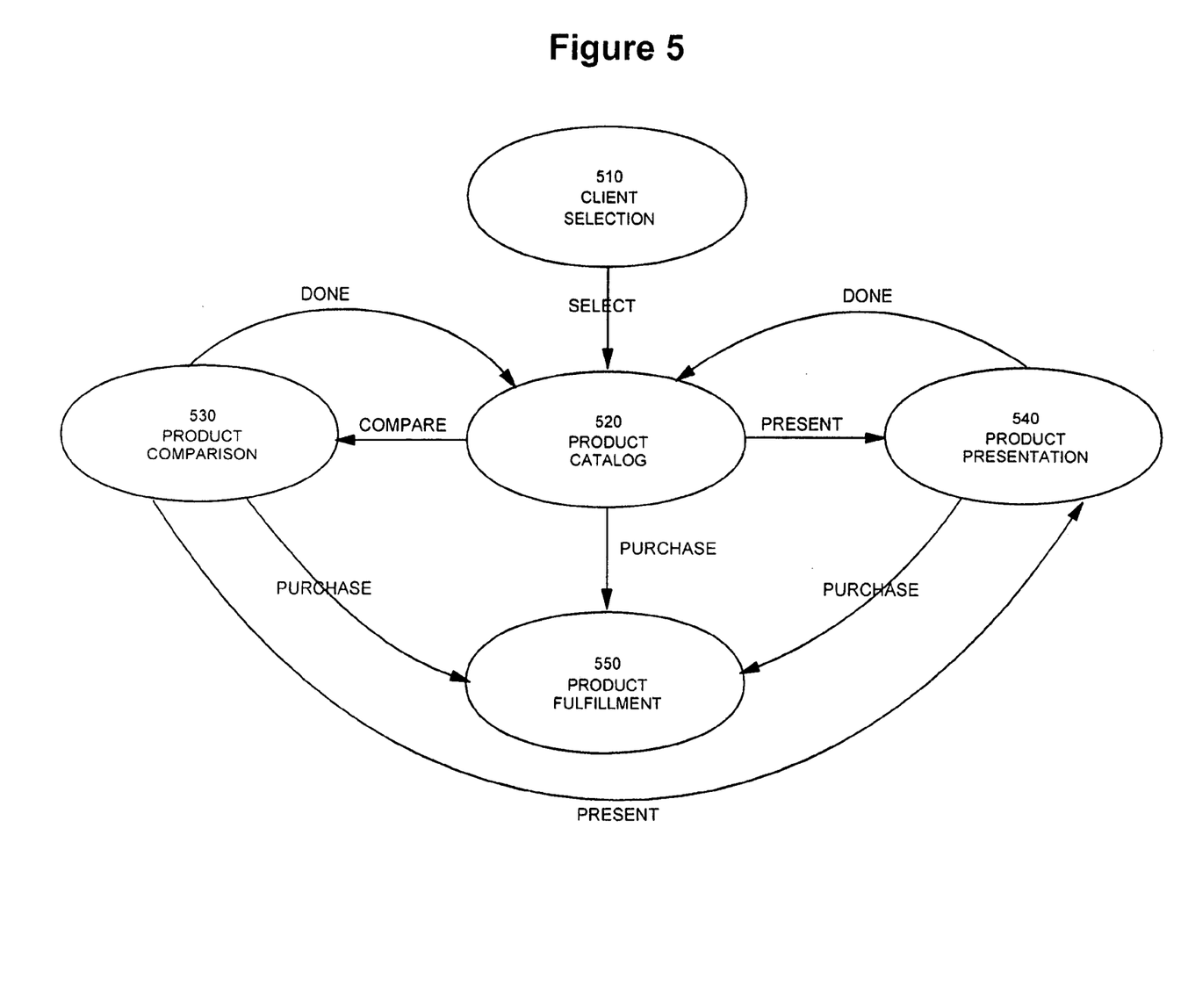
FIG. 5 is an example of a state transition diagram of a product sales application that can be implemented according to principles of the invention.

Factoring an application into a series of separate screens, each with its own specific purpose, increases the opportunities for reuse of user-interface components which create and maintain the separate screens. Scripting combines these individual screens into a sequence to become an application. The user-interface component screens can be referred to as nodes. FIG. 5 is a state transition diagram to communicate product information in a sales application. Each node 510, 520, 530, 540 and 550 represents a separate task and in FIG. 5, each task has its own user-interface component, although not all tasks require a user-interface component. From the first node 510 in which a client is selected, it is possible to navigate to the product catalog node 520 and its corresponding user-interface component. From the product catalog node 520, it is possible for the user to navigate to three other nodes depending upon an event occurring in the product catalog user-interface 520: the product comparison 530: the product presentation 540; and the product fulfillment 550, each having its respective user-interface component. Each of the nodes 510–550 can be considered a leaf node because these nodes do not have other nested tasks, and hence do not have other nested user-interface components, referred to as a branch node. Thus, these nodes are glued or linked together by a script to perform a task within the user session. Within a script, a node identifies a service as well as a collection of attributes for the service. The attributes move from node to node, each of which may be associated with a service. In this way, several services which may or may not be associated with a user-interface component are combined to execute a task. The nodes are implemented by decoupled, independent components that have no direct knowledge of one another but share data to complete a task. In the example given, a node may comprise: a comment that is a descriptive title for the node, but may also describe the service or how the service is being used; a non-asterisked, non-indented line that identifies the start of a node and contains the name of the node, also used to name the service for checking security access; and a service provider that is the controller class to define actions provided by the service. If the script was written in JAVA, the controller class is a fully qualified JAVA class and implements the service provider interface.

This invention solves the problem of downloading large amounts of executable code to implement the user-interface of an application in several ways. First and most important, the script executes on the server and is not downloaded to the client. Second, the code associated with tasks no longer needed can be removed from memory thus reducing the memory required for execution of the application. The invention also provides a solution for assembling reusable task definitions in a simple and straightforward fashion by coordinating the flow from one task to another and providing a data dictionary to transfer information between tasks.

Figure 6:
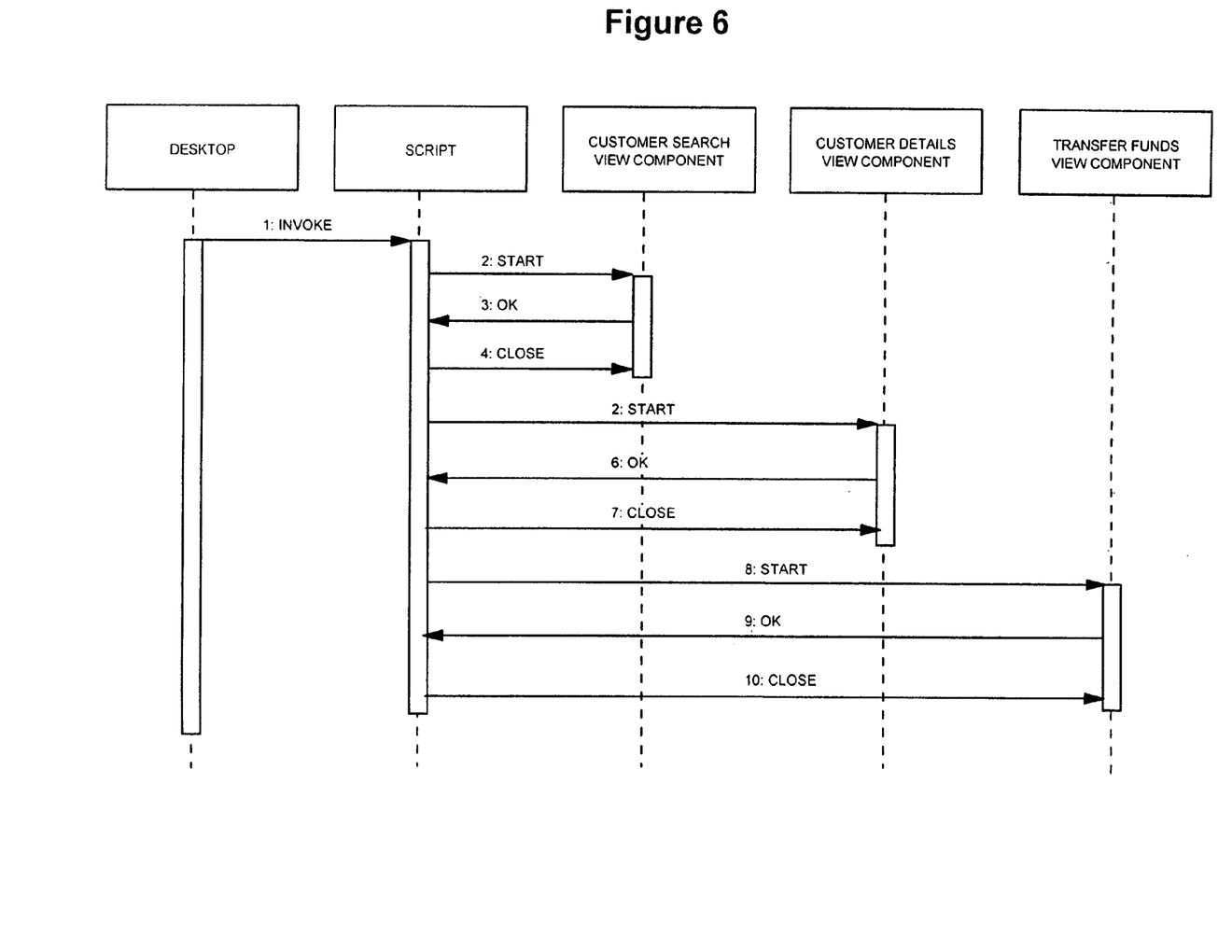
FIG. 6 is an interaction diagram between a container/desktop, a script, and user-interface components of a banking/transfer funds application in accordance with the preferred embodiment of the invention.

A script is simply code specifying the user-interface component screens that make up an application and how they fit together. The script is specified in a scripting language in a script file on the server and may be a text file or one or more service provider nodes. FIG. 6 is an example of how the script works in the context of a banking/transfer funds application. The container/desktop invokes and runs the script by referring to the URL for the script file in step 1. Inputs to the script are provided by the application's service nodes, by associated events, and by a container/desktop's validation of any preconditions, such as data credentials. The script provides the information that allows the scripting framework to select the appropriate service for a particular node, creating operations as simple as showing a message box or as complex as making a multiple currency deposit, and in the example shown in FIG. 6, starting the user-interface component that searches for a customer in step 2. Once the script has been initiated and performs its task or service, as in step 3, i.e., a customer has been located, that user-interface component closes in step 4 and the information is passed by the script to the next user-interface component. The cycle is repeated for each user-interface component in which the script starts the user-interface component for, e.g., customer details, executes the script and closes the script, as in steps 5–7 of FIG. 6. Again, once the details of the customer are presented and verified, and assuming that the application is proceeding without error, then the user interface component for the customer details passes any required data to the transfer funds user-interface component which is then closed. The script starts and executes the user-interface component to transfer funds in steps 8 and 9. Similarly, the transfer funds user-interfaces closes in step 10 when it has completed. In this way, the script invokes and passes data through to each user-interface component, rather than the prior art paradigm of a user-interface component invoking and passing data to the subsequent user-interface component, all the while remaining open. The savings in cost and time of not downloading large amounts of software is enormous.

Figure 7:
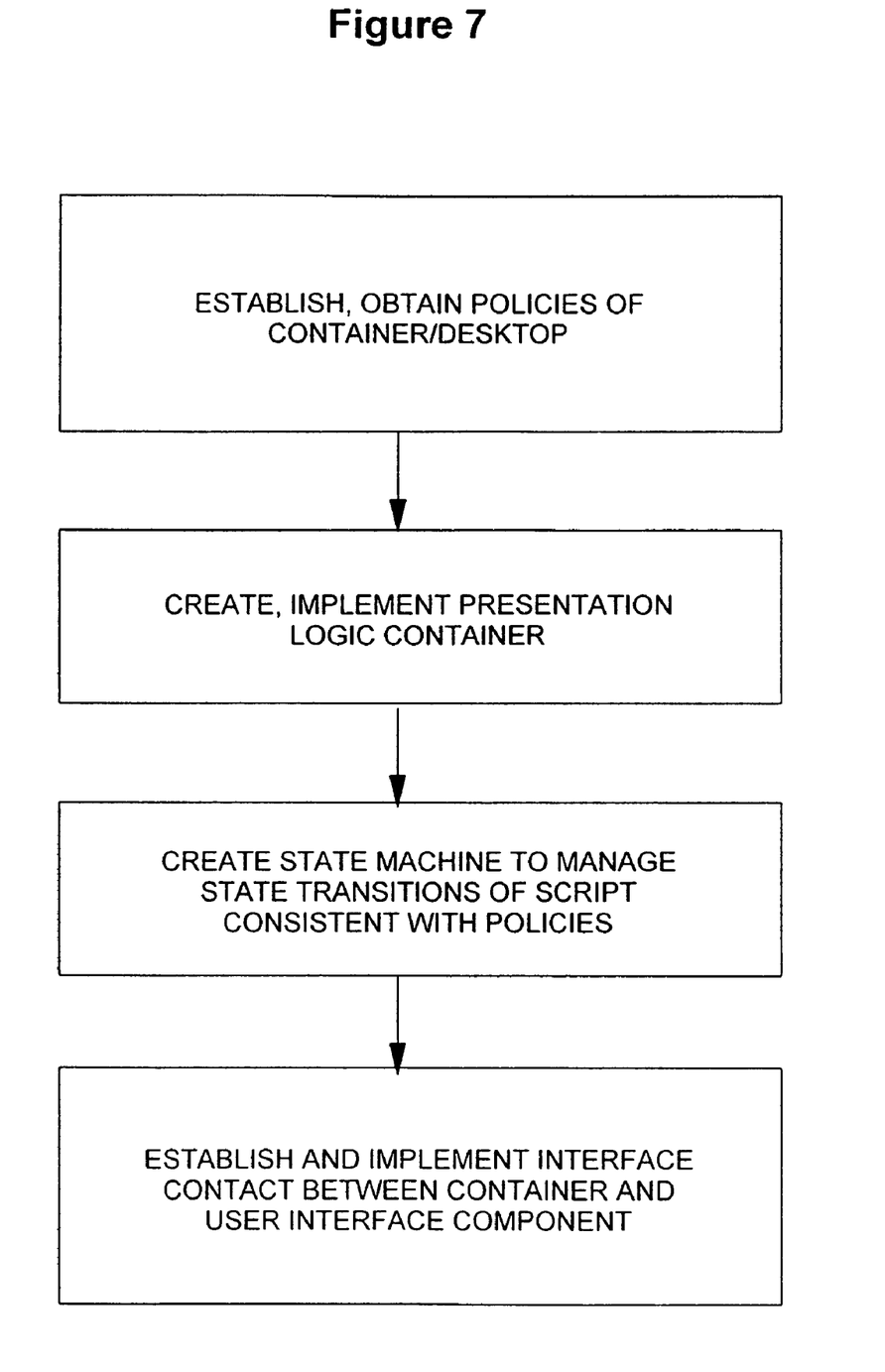
FIG. 7 is a simplified flow diagram of how to build a user-interface scripting system in accordance with principles of the preferred embodiment of the invention.

FIG. 7 is a simplified flow diagram of how to build a user-interface scripting system. In step 700, the pertinent policies as discussed earlier of the container/desktop with respect to a particular client device are established or obtained. In step 710, the presentation logic of the container/desktop is created or implemented within these policy constraints. In step 720, a scripting engine, also called a finite state machine, that becomes part of the intended application is created to manage state transitions of the script consistent with container/desktop policies. In step 730, the interface contract between the container/desktop and the user-interface component is created. This contract provides, for example in object oriented programming, the method calls for the user-interface component and the container/desktop to be able to be interdependent in the script.

Figure 8:
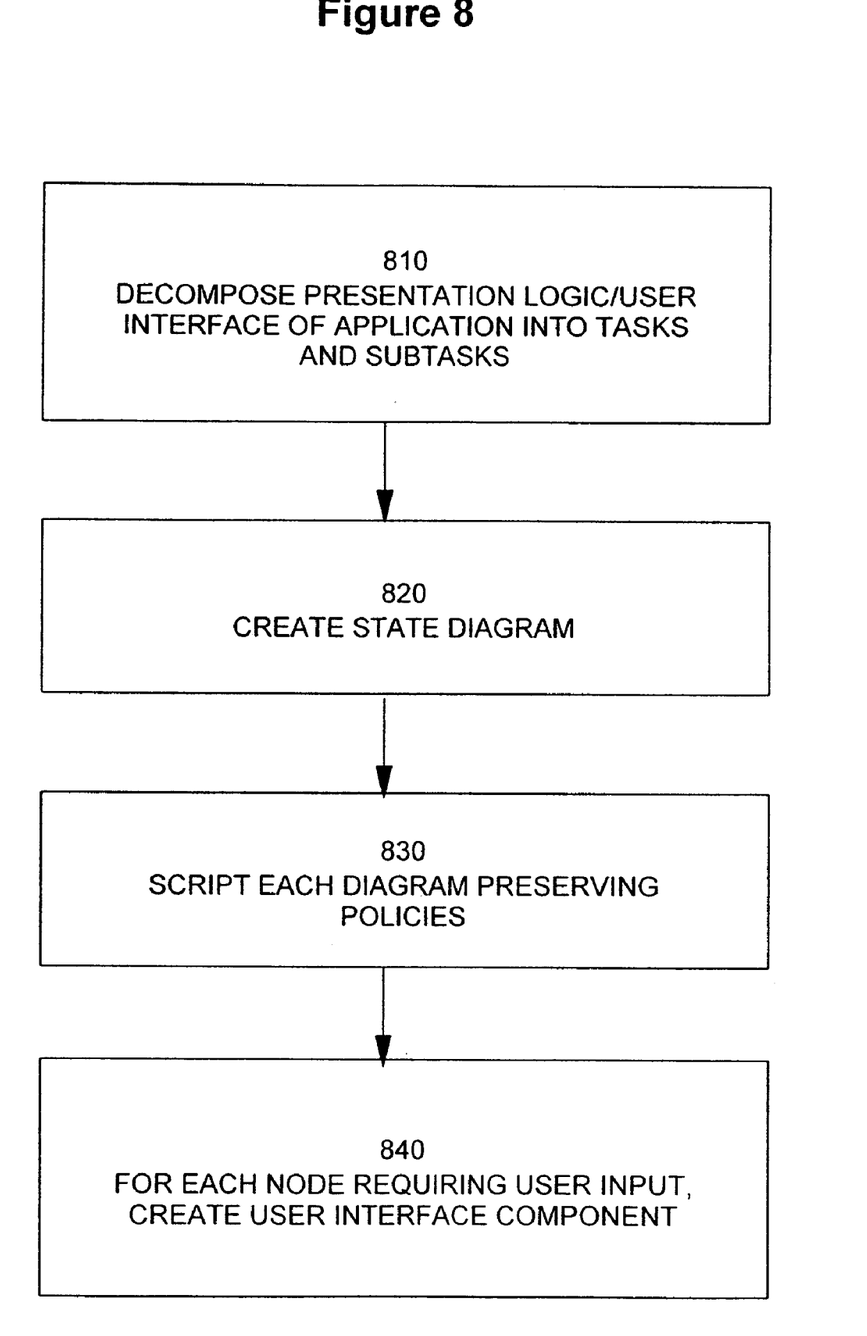
FIG. 8 is a simplified flow diagram of how to create an application by scripting user-interface components in accordance with preferred principles of the inventions.

Once the policies, the presentation logic, the scripting engine, and the interface contract are in place, then a software developer can create applications which take advantage of scripting user-interface components according to a preferred embodiment of the invention. FIG. 8 is a simplified flow diagram of how to do this. In step 800, the overall presentation logic of the application's user-interface is decomposed into tasks and subtasks. A state diagram, such as in FIG. 5, is created for the application and for each branch node within the application. In step 830, each state diagram is scripted preserving the policies of the container/desktop. In step 840, for each leaf node that does not nest another node, a user-interface component is created within the script created in step 830.

The container/desktop uses scripting to take advantage of the fact that a script is interpreted rather than compiled. Because the container/desktop acts as a portal to the available applications, the flow of services from it are not only highly specific to the installation, but may also change frequently. Modifications to the flow of user-component interfaces from the container/desktop are more easily implemented within a scripting framework. Scripting, moreover, simplifies the maintenance of user-interface components used by multiple applications. When those user-interface components are part of a script, they can be updated once in the script, and all the applications using that script then use the updated version of the user-interface component without having to rewrite and recompile the application code. Script files can be reused by multiple applications and when the scripts are stored on a server, they can be reused by any client.

Figure 9:
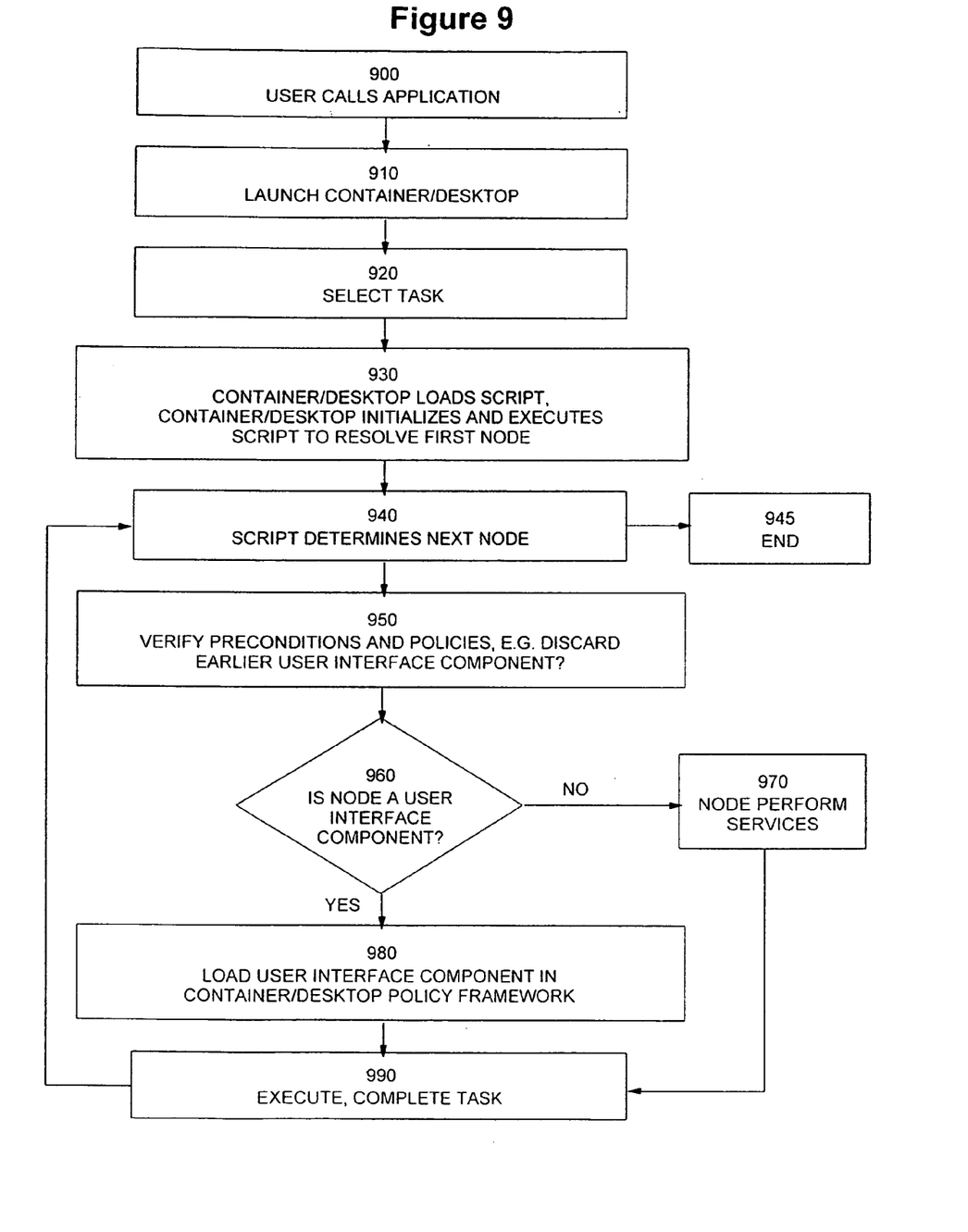
FIG. 9 is another simplified flow diagram of an example of an application executing scripted user-interface components in accordance with preferred principles of the invention.

The separation of the script manager running on the server from the application container/desktop running on the client creates a very powerful and robust environment for applications. For example, if the client loses its connection with the server because of local failure, it has the ability to reconnect with the script manager and reestablish the state of the application. Defining a container that runs on the client that is independent of the script manager means that policies affecting the display of panels for the application can be implemented without having to make changes to the flow of scripts. The following description, in conjunction with the simplified general flow chart of FIG. 9, is an example of an application executing scripted user-interface components.

The specific application is a banking transaction and the user-interface components display visual information on a client device. One of ordinary skill in the art may recognize the "averageness" of the example. Thus, for smaller hand-held client devices, the application and its corresponding user-interface components may be less complex whereas for PCs and other servers, the application and corresponding user-interface components may be very complex, having not only visual, but also other sensory interfaces. In the following example, the system comprises a server and a client device.

In step 900, the user calls the application by, e.g., clicking on an icon on a container/desktop or voicing a response into a microphone. The user-interface presentation logic of that application is launched in step 910, either on the server or on the client, or a combination of both. The user selects a task to perform in step 920. Then in step 930, the container/desktop locates, initializes, and executes the script associated with the task. The script file can be accessed by using a process( ) method which identifies the script file using its URL, for example, the following accesses a script file:

```
COM.footprint.appsvc.scripting.base.ServiceScript script;
...
try {
    script = ScriptProcessor.process(http://myServer/scripts/myScript.text");
}catch (SPException e) { . . .}
```

The script files may be located and/or hard-coded in a specified directory, such as the/RESOURCES/directory, on the server. Should the location of the resources change, as in for example, in configuring a customized container/desktop, methods may be provided for accessing information about the scripting component itself (meta-data). Once the script file has been located, the script file location is retrieved and a file from within a script file is also located to retrieve the scripting service. For example, if the location of a script file is set in the vb.properties files, the following example of code can retrieve the location:

```
private String getScriptLocation( ) throws SPException {
    String s = null;
    try {
        s = Kernel.getProperty(vb.script");
    }
    catch (Exception e) {
        handleException(e);
    }
    if (s=null)
        throw new SPException ("Cannot find the script file - property
        vb.script returns null.");
    return s;
}
```

Once a script file has been identified, the server determines the entry point for the script file. An entry node identifies the first service to be performed and a default entry point may be the first service provider node in the script. The entry node may contain links to other nodes to create a simple or complex operation.

In step 940, the script determines the next node. The other nodes, however, are not necessarily in the same script file or on the same server as the first node. If a node refers to a second script file, the entry point for the second script file preferably is the first service provider node listed in the file. To locate a script file from within a script file when the linked node is not within the current script file, one may provide either the name or a script file using the file's URL or the default applet server by beginning the specification with a slash. The application will probably run the service in the first node in the linked script file. The following format may be useful to provide the script file:

on event do file locationOfScript

In the following example, the script named demo is located using the URL:

on demo go to file http://myServer//resources/scripts/demo.txt

In the following example, the script named demo1.txt is located using the applet default server:

on demo goto file/resource/scripts/demo1.txt

To retrieve the scripting service, the following code can be used:

```
public ServiceScript initServiceScript( ) {
    try {
        return ScriptProcessor.process(getScriptLocation( ), this);
    }
    catch (Exception e) {
        handleException(e):
    }
    return null;
}
```

After the script determines the next node, in step 950, a link must be established to the node and data accessed in accordance with container/desktop's policies. Each node or user-interface component has certain responsibilities as a participant in a script. The documentation for the user-interface component-should specify the events that the user-interface component triggers. The user-interface component should further specify what preconditions such as data credentials it needs in order to run, e.g., it may assume that some information is available with a particular name. The user-interface component should also specify what it accomplishes. If JAVA is used as the programming language, the user-interface controller class is intended to be a superclass of all user-interface controller classes and extends the simple service class and, as such, should be a fully qualified Java class. If the user-interface component is a container/desktop applet, each script node has a user-interface class, and the container/desktop holding the user-interface gets set to the ScriptPane associated with that user-interface controller.

A node having a service or a user-interface component may link to another service, another user-interface component, or back to the script. The script must establish a reference to another node and then the data credentials and other policies must be verified. A link to a node should specify a unique event within the current node and identify a node within the current script file or identify another file. In a particular embodiment, the navigation policy of how a script may link to another node has been implemented by "on do", "on call", and "on goto" statements, depending upon an arbitrary classification scheme of services rendered in each node. Parent services are constantly being notified of the state of the child services. A child is the current service in a node. There may be, moreover, a complex relationship between the parent and child and under what circumstances the parent gets notified of changes in state. The kind of parent is considered when building a sequence of user-interface components and transferring data between them,
e.g., a service invoked by a "do" scripting statement may suspend the parent service; one invoked by a "call" scripting statement does not suspend the parent; and a service invoked by a "goto" scripting statement terminates the parent. These scripting statements are given by way of example only and other scripts may have more or fewer or even different statements in which to navigate between user-interface components.

In this particular example, user-interface components may share data through two mechanisms: session properties and script properties. It is to be understood that other methods of validating and sharing data may extend to other programming and scripting languages. Sessions properties hold data that persist for the lifetime of the user session and should only be used to store data that actually needs to be available for that lifetime. Script properties are similar to session properties; but exist only while the script is running. Preferably script properties are the principal means by which user-interface components share data if the data does not need to persist beyond the script lifetime. Script properties may be name-value pairs stored in a dictionary. Scripts may invoke other scripts, just as they invoke nodes. A script assumes all responsibility of a node to provide information to the script in which the node is contained.

By way of example only, within a user-interface component script, service classes may use the following methods to send or retrieve data to the controller returned by the getcontroller( ) method. To send data, the putData(aVariableName, data) method sets the value for a variable in the returned controller. To retrieve data, the getData(aVariableName) method gets the value of the variable in the returned controller. Within a controller script, the getParent( ) method is used to return the parent class of the controller. "Put" and "get" methods then provide or retrieve a value for the variable used in the returned class. The putData( ) method calls the acceptData( ) method, attempting to transfer the data collected in the node to the next service. If the acceptData( ) method returns true, the next service gets the data. If it returns false, then the putData( ) method goes to the parent service to try to get it to accept its data. An event that gets triggered will look up the next node to go to, but does not invoke the next service right away.

Before it invokes the next user-interface component, scripting verifies any container/desktop preconditions, such as data credentials. If the actionRequest key is the same as the request key, the system performs the service at the node. If the data credentials are not right, then it sets the request key to the event to handle the missing data credential and sets the target action to point to the event that handles the new service. Along with other container/desktop policies to be verified is whether the previous user-interface component is to be discarded according to the garbage collection policies of the container/desktop and if application may be closed by the user, as in step 945.

In step 960, an inquiry is made into whether the script node is a user-interface component, i.e., is a service a user-interface controller and does the node have the user-interface class associated with that controller. If so, scripting automatically launches the user-interface component associated with that node consistent with the container/desktop's policies, as in step 980. The service class in the node, and the user-interface controller then reference the container/desktop to interrogate the user-interface. The service in the node should be the user-interface controller associated with the user-interface. This illustrates a particular useful aspect of the invention: the service in the node is not decoupled from the user-interface component. Upon completion of the task performed in that user-interface component, as in step 990, the process loops back up to step 940 to determine the next node and if there is no next node, the script ends as in step 945.

If, in step 960, the node is not a user-interface component, then a service provider provided by a service controller class implements the service provider interface. In an exemplary script example, the COM.footprint.appsvc.scripting.base package contains an implementation of a service provider interface, an abstract simple service class intended to be subclassed to create the services needed for the particular application. In the example provided, the simple service class defines several constants that describe the current state of the active service and provides the methods to set them: (1) servicing; (2) stopped; and (3) suspended. These constants correspond to constants defined in the service provider interface and are IDs for the notification of the service status. Another constant defined by the service provider interface is an identifier for notification of a restored state in the service. Once the service is completed, as in step 990, the script continues to process by resolving the next mode 940.

Thus, in the preferred embodiment of an application, the user-interface components are scripted together in an application which is maintained and retained in a server. Only the user-interface components that are needed are downloaded to the client and the desktop/container manages the initialization, the execution, and the termination of the user-interface components. The script itself on the server then manages the script's contract with the desktop/container policies and if not needed, a user-interface component is discarded before another is initialized. As such, an application proceeds from user-interface component to user-interface component in an efficient process capable of accommodating many different container/desktops.

While the invention has been described with respect to the preferred embodiment, it will be understood by those skilled in the art that various changes in detail may be made therein without departing from the spirit, scope, and teaching of the invention. Accordingly, the invention disclosed is to be limited only as specified in the following claims.

The embodiments of the invention in which an exclusive property or privilege is claimed are defined as follows:

1. A method comprising:
   calling the software application residing on a server from one of a plurality of clients, the clients and the server connected to each other through at least one network, the software application having a plurality of policy frameworks, each of the frameworks being associated with a respective one of the plurality of clients;
   launching a container/desktop of one of the plurality of clients consistent with the respective policy framework of the one client, wherein the container/desktop includes a software for displaying a user-interface on a display in a computer;
   the container/desktop initializing and communicating to the server to execute a script of the application;
   executing the script on the server, the script downloading a first user-interface component of the application to the container/desktop;
   the container/desktop executing the first user-interface component;
   the first user interface component linking to and starting a subsequent user-interface component of the script; and
   in response to the subsequent user-interface component of the script being started, the software in the container/desktop automatically closing the first user-interface component and removing the first user-interface from a system memory in the computer.

2. The method of claim 1, further comprising the step of said script starting and executing the user-interface components within a policy framework of the container/desktop.

3. The method of claim 1, further comprising the container/desktop removing the user-interface components from memory within the client when the user-interface component is closed.

4. The method of claim 1, wherein the first user-interface component directly passes data to the subsequent user-interface component before the first user-interface component closes.

5. The method of claim 1, wherein the first and subsequent user-interface components are decoupled from the software application, such that an execution context of the user-interface components can be changed without affecting application code in the software application.

6. The method of claim 5, wherein the user-interface components are decoupled via a script on a server managing a contract between the script and a policy of the container/desktop.

7. The method of claim 6, wherein the policy describes a number of tasks that can be simultaneously executed on a client computer.

8. The method of claim 6, wherein the policy describes a visual policy on a client computer, and wherein the visual policy describes a position, sizing and cropping of a user-interface component.

9. The method of claim 1, further comprising:
   in response to the subsequent user-interface component of the script being started, the software in the container/desktop automatically removing the first user-interface from a disk storage in the computer.

10. A computer-readable storage medium embodying computer program code, the computer program code comprising computer executable instructions configured to:
    call the software application residing on a server from one of a plurality of clients, the clients and the server connected to each other through at least one network, the software application having a plurality of policy frameworks, each of the frameworks being associated with a respective one of the plurality of clients;
    launch a container/desktop of one of the plurality of clients consistent with the respective policy framework of the one client, wherein the container/desktop includes a software for displaying a user-interface on a display in a computer;
    use the container/desktop to initialize and communicate to the server to execute a script of the application;
    execute the script on the server, the script downloading a first user-interface component of the application to the container/desktop;
    use the container/desktop to execute the first user-interface component;
    use the first user interface component to link to and start a subsequent user-interface component of the script;
    in response to the subsequent user-interface component of the script being started, the software in the container/desktop automatically closing the first user-interface component and removing the first user-interface from a system memory in the computer; and
    download the subsequent user-interface component to the container/desktop, and the container/desktop executing the subsequent user-interface component and then closes the subsequent user-interface component.

11. The computer-readable storage medium of claim 10, wherein the first user-interface component passes data to the subsequent user-interface component before the first user-interface component closes.

12. The computer-readable storage medium of claim 10, wherein the first and subsequent user-interface components are decoupled from the software application, such that an execution context of the user-interface components can be changed without affecting application code in the software application.

13. The computer-readable storage medium of claim 12, wherein the user-interface components are decoupled via a script on a server managing a contract between the script and a policy of the container/desktop.

14. The computer-readable storage medium of claim 13, wherein the policy describes a number of tasks that can be simultaneously executed on a client computer.

15. The computer-readable storage medium of claim 13, wherein the policy describes a visual policy on a client computer, and wherein the visual policy describes a position, sizing and cropping of a user-interface component.

16. A system comprising:
   means for calling the software application residing on a server from one of a plurality of clients, the clients and the server connected to each other through at least one network, the software application having a plurality of policy frameworks, each of the frameworks being associated with a respective one of the plurality of clients;
   means for launching a container/desktop of one of the plurality of clients consistent with the respective policy framework of the one client, wherein the container/desktop includes a software for displaying a user-interface on a display in a computer;
   means for the container/desktop to initialize and communicate to the server to execute a script of the application;
   means for executing the script on the server, the script downloading a first user-interface component of the application to the container/desktop;
   means for the container/desktop to execute the first user-interface component;
   means for the first user interface component to link to and start a subsequent user-interface component of the script; and
   means for, in response to the subsequent user-interface component of the script being started, the software in the container/desktop automatically closing the first user-interface component and removing the first user-interface from a system memory in the computer.

17. The system of claim 16, further comprising means for said script to start and execute the user-interface components within a policy framework of the container/desktop.

18. The system of claim 16, further comprising means for the container/desktop to remove the user-interface components from memory within the client when the user-interface component is closed.

19. A system comprising:
   means for calling the software application residing on a server from one of a plurality of clients, the clients and the server connected to each other through at least one network, the software application having a plurality of policy frameworks, each of the frameworks being associated with a respective one of the plurality of clients;
   means for launching a container/desktop of one of the plurality of clients consistent with the respective policy framework of the one client, wherein the container/desktop includes a software for displaying a user-interface on a display in a computer;
   means for using the container/desktop to initialize and communicate to the server to execute a script of the application;
   means for executing the script on the server, the script downloading a first user-interface component of the application to the container/desktop;
   means for using the container/desktop to execute the first user-interface component;
   means for using the first user interface component to link to and start a subsequent user-interface component of the script;
   means for, in response to the subsequent user-interface component of the script being started, the software in the container/desktop automatically closing the first user-interface component and removing the first user-interface from a system memory in the computer; and
   means for downloading the subsequent user-interface component to the container/desktop, and the container/desktop executing the subsequent user-interface component and then closes the subsequent user-interface component.

20. The system of claim 19, wherein the first user-interface component passes data to the subsequent user-interface component before the first user-interface component closes.

21. The system of claim 19, wherein the first and subsequent user-interface components are decoupled from the software application, such that an execution context of the user-interface components can be changed without affecting application code in the software application.

22. The system of claim 21, wherein the user-interface components are decoupled via a script on a server managing a contract between the script and a policy of the container/desktop.

23. The system of claim 22, wherein the policy describes a number of tasks that can be simultaneously executed on a client computer.

24. The system of claim 22, wherein the policy describes a visual policy on a client computer, and wherein the visual policy describes a position, sizing and cropping of a user-interface component.

* * * * *